US008144837B2

(12) United States Patent
Guedalia et al.

(10) Patent No.: US 8,144,837 B2
(45) Date of Patent: Mar. 27, 2012

(54) METHOD AND SYSTEM FOR ENHANCED USER EXPERIENCE OF AUDIO

(75) Inventors: David Guedalia, Bet Shemesh (IL); Sarah Raanan, Bet Shemesh (IL)

(73) Assignee: Dialogic Corporation, Montreal, Quebec (CA)

( * ) Notice: Subject to any disclaimer, the term of this patent is extended or adjusted under 35 U.S.C. 154(b) by 1816 days.

(21) Appl. No.: 09/996,278

(22) Filed: Nov. 28, 2001

(65) Prior Publication Data

US 2002/0097842 A1    Jul. 25, 2002

Related U.S. Application Data

(60) Provisional application No. 60/263,415, filed on Jan. 22, 2001.

(51) Int. Cl.
*H04M 1/64* (2006.01)
*H04M 15/00* (2006.01)
*G06Q 30/00* (2012.01)

(52) U.S. Cl. ....... 379/68; 379/88.22; 379/133; 705/14.4

(58) Field of Classification Search ............... 379/88.22, 379/67.1–76
See application file for complete search history.

(56) References Cited

U.S. PATENT DOCUMENTS

| | | | | |
|---|---|---|---|---|
| 5,142,528 A * | 8/1992 | Kobayashi et al. | ........... | 370/469 |
| 5,481,543 A * | 1/1996 | Veltman | ........... | 370/473 |
| 5,526,353 A * | 6/1996 | Henley et al. | ........... | 370/392 |
| 5,557,541 A * | 9/1996 | Schulhof et al. | ........... | 700/94 |
| 5,572,442 A * | 11/1996 | Schulhof et al. | ........... | 709/219 |
| 5,629,867 A * | 5/1997 | Goldman | ........... | 381/77 |
| 5,726,909 A * | 3/1998 | Krikorian | ........... | 700/94 |
| 5,778,187 A * | 7/1998 | Monteiro et al. | ........... | 709/231 |
| 5,790,423 A * | 8/1998 | Lau et al. | ........... | 700/94 |
| 5,809,246 A * | 9/1998 | Goldman | ........... | 709/217 |
| 5,828,839 A * | 10/1998 | Moncreiff | ........... | 709/204 |
| 5,841,979 A * | 11/1998 | Schulhof et al. | ........... | 709/237 |
| 5,844,158 A * | 12/1998 | Butler et al. | ........... | 84/650 |
| 5,859,660 A * | 1/1999 | Perkins et al. | ........... | 725/32 |
| 5,867,530 A * | 2/1999 | Jenkin | ........... | 375/259 |
| 5,892,536 A * | 4/1999 | Logan et al. | ........... | 725/34 |
| 5,917,830 A * | 6/1999 | Chen et al. | ........... | 370/487 |
| 5,922,045 A * | 7/1999 | Hanson | ........... | 709/206 |
| 5,926,624 A * | 7/1999 | Katz et al. | ........... | 709/217 |
| 5,956,681 A * | 9/1999 | Yamakita | ........... | 704/260 |
| 6,012,086 A * | 1/2000 | Lowell | ........... | 709/218 |
| 6,014,569 A * | 1/2000 | Bottum | ........... | 455/466 |
| 6,088,455 A * | 7/2000 | Logan et al. | ........... | 380/200 |
| 6,205,419 B1 * | 3/2001 | Fiedler | ........... | 704/201 |
| 6,219,694 B1 | 4/2001 | Lazaridis et al. | | |

(Continued)

OTHER PUBLICATIONS

Victor W. Zue "Navigating the Information Superhighway Using Spoken Language Interfaces", IEEE Expert, Oct. 1995, pp. 39-43.

(Continued)

*Primary Examiner* — Joseph T Phan
(74) *Attorney, Agent, or Firm* — Weingarten, Schurgin, Gagnebin & Lebovici LLP (57) ABSTRACT

A system and method for providing enhanced quality audio streaming, including an audio streaming server providing an audio stream, a client including a buffer storing at least portions of the audio stream received from the audio streaming server, a buffer status sensor operative to monitor the contents of the buffer and a client audio output enhancer operative in response to an output from the buffer status sensor for providing a modified audio stream output.

14 Claims, 5 Drawing Sheets

U.S. PATENT DOCUMENTS

| | | | | |
|---|---|---|---|---|
| 6,248,946 B1* | 6/2001 | Dwek | | 84/609 |
| 6,249,810 B1* | 6/2001 | Kiraly | | 709/217 |
| 6,289,207 B1* | 9/2001 | Hudecek et al. | | 455/150.1 |
| 6,314,094 B1* | 11/2001 | Boys | | 370/352 |
| 6,339,761 B1* | 1/2002 | Cottingham | | 705/14.66 |
| 6,349,329 B1* | 2/2002 | Mackintosh et al. | | 709/219 |
| 6,351,736 B1* | 2/2002 | Weisberg et al. | | 705/14.46 |
| 6,381,314 B1* | 4/2002 | Walinski | | 379/101.01 |
| 6,389,032 B1* | 5/2002 | Cohen | | 370/412 |
| 6,389,463 B2* | 5/2002 | Bolas et al. | | 709/219 |
| 6,418,138 B1* | 7/2002 | Cerf et al. | | 370/352 |
| 6,463,468 B1* | 10/2002 | Buch et al. | | 709/219 |
| 6,496,857 B1* | 12/2002 | Dustin et al. | | 709/219 |
| 6,557,028 B2* | 4/2003 | Cragun | | 709/205 |
| 6,647,257 B2* | 11/2003 | Owensby | | 455/414.1 |
| 6,658,027 B1* | 12/2003 | Kramer et al. | | 370/516 |
| 6,684,249 B1* | 1/2004 | Frerichs et al. | | 709/225 |
| 6,993,081 B1* | 1/2006 | Brunheroto et al. | | 375/240.28 |
| 7,107,309 B1* | 9/2006 | Geddes et al. | | 709/203 |
| 7,203,758 B2* | 4/2007 | Cook et al. | | 709/231 |
| 7,213,259 B2* | 5/2007 | Archibald et al. | | 726/3 |
| 7,360,210 B1* | 4/2008 | Vacanti et al. | | 717/171 |
| 7,366,682 B1* | 4/2008 | Katiyar et al. | | 705/14.51 |
| 7,401,151 B2* | 7/2008 | Chatani | | 709/229 |
| 7,512,973 B1* | 3/2009 | Chan et al. | | 726/10 |
| 7,568,002 B1* | 7/2009 | Vacanti et al. | | 709/203 |
| 7,600,011 B1* | 10/2009 | Urbanek | | 709/223 |
| 7,657,057 B2* | 2/2010 | Davidson et al. | | 382/100 |
| 7,685,036 B1* | 3/2010 | Hsu et al. | | 705/35 |
| 7,697,944 B2* | 4/2010 | van As et al. | | 455/466 |
| 7,774,817 B2* | 8/2010 | Gupta | | 725/86 |
| 7,801,945 B1* | 9/2010 | Geddes et al. | | 709/203 |
| 7,836,183 B1* | 11/2010 | Barnett et al. | | 709/226 |
| 7,840,691 B1* | 11/2010 | De Bonet et al. | | 709/231 |
| 7,853,782 B1* | 12/2010 | Geddes | | 713/151 |
| 7,860,995 B1* | 12/2010 | Singh et al. | | 709/231 |
| 7,890,369 B2* | 2/2011 | Mooney | | 705/14.4 |
| 7,895,088 B2* | 2/2011 | Hunter | | 705/27.2 |
| 7,917,389 B2* | 3/2011 | Mooney | | 705/14.4 |
| 7,921,035 B2* | 4/2011 | Adelman | | 705/14.4 |
| 7,961,949 B2* | 6/2011 | Levy et al. | | 382/190 |
| 8,028,092 B2* | 9/2011 | Brown et al. | | 709/246 |
| 8,036,418 B2* | 10/2011 | Meyer et al. | | 382/100 |
| 8,036,689 B2* | 10/2011 | van As et al. | | 455/466 |
| 8,037,152 B2* | 10/2011 | Crandall | | 709/217 |
| 8,051,445 B2* | 11/2011 | Barrett et al. | | 725/36 |
| 2001/0034219 A1* | 10/2001 | Hewitt et al. | | 455/186.1 |
| 2002/0067730 A1* | 6/2002 | Hinderks et al. | | 370/395.52 |
| 2002/0072326 A1* | 6/2002 | Qureshey et al. | | 455/3.02 |
| 2002/0095228 A1* | 7/2002 | Corts et al. | | 700/94 |
| 2002/0097842 A1* | 7/2002 | Guedalia et al. | | 379/67.1 |

OTHER PUBLICATIONS

Matthew Lennig, "Putting Speech Recognition to Work in the Telephone Network", IEEE Institute of Electrical and Electronic Engineers, Aug. 1990, pp. 35-41.

Frank Stajano, et al., "The Thinnest of Clients: Controlling It All Via Cellphone", Mobile Computing and Communications Review, vol. 2, No. 4, Oct. 1998.

REALAUDIO®, www.real.com. Dec. 2001.

Creative Technology Ltd's EAX Technology®. Oct. 2001.

DIR911 Audio Processor of Eventide, Inc. Oct. 2001.

Barry Arons, SpeechSkimmer: Interactivity Skimming Recorded Speech. Proceedings of UIST 1993: ACM Symposium of user Interface Software and Technology. ACM Pres. Nov. 3-5, 1993, Atlanta. pp. 187-196.

U.S. Appl. No. 09/798,377, entitled: "Telephone and Wireless Access to Computer Network-Based Audio", filed Mar. 2, 2001.

* cited by examiner

Fig.5

METHOD AND SYSTEM FOR ENHANCED USER EXPERIENCE OF AUDIO

REFERENCE TO RELATED APPLICATIONS

This application claims priority from U.S. Provisional Application Ser. No. 60/263,415 entitled 'A Method and System for Enhanced Streaming of Audio to Telephone', filed Jan. 22, 2001.

FIELD OF THE INVENTION

The present invention relates to a system and method for audio buffering and navigation.

BACKGROUND OF INVENTION

Users' experience of media content such as films, music and lectures, has been enhanced through advances in audio technology. Technological advances have improved audio transmission quality and provided tools to the user that enhance the user's experience.

One of the key technological enhancements in audio transmission is 'streaming'. Streaming can be defined as a technique for transferal of data while continually processing the data. For example, a computer can take advantage of streaming technology to render audio during a download. Streaming is thus useful for users who wish to listen to extensive sections of audio without having to wait for transfer of the entire data. Rather than downloading the file in its entirety before playing, users can start listening to the audio before the transmission is completed When streaming audio over a network, traffic problems are often encountered and the delivery of a steady stream of packets to the client is not always possible. During these periods of congestion, the user may experience disruption in service. For example, should network congestion occurs when using a REAL AUDIO® player, the player will cease rendering audio and display the words 'buffering' accompanied by flashing red and green lights (see www.real.com). This buffering occurs when the rate at which packets arrive from the server to the client is slower than the rate from client to user. To limit the occurrence of interruption, streaming clients employ a buffer, typically embodied in a segment of memory, of most recently received audio packets.

Typically the network may slow down or speed up for periods of time, corresponding to low or high bandwidth availability. During times of high bandwidth, the buffer is filled; when transmission degrades, packets drawn from the buffer ensure a smooth rendering from the client to the user. The buffer operates in a First In First Out (FIFO) manner, whereby only the most recent bytes are stored. This is accomplished by constantly playing from the buffer while simultaneously inserting new bytes.

As the frequency of network problems increase, the contents of the buffer gradually decrease. When the buffer has been depleted, playing may cease.

Existing technology for navigation within audio samples provides users with basic navigational functions such as 'fast forward', 'rewind' and 'pause'. In addition to these basic functions, current technologies are capable of more advanced functions such as 'time compression', which enables the speeding up or slowing down of audio content without changing the pitch or audio quality. For instance, Creative Technology Ltd's EAX Technology® offers advanced audio functionality and performance for digital audio. EAX Technology® includes time-scaling adjustments in order to change the speed of the audio to suit the user's individual preferences.

In addition to time-scaling, InterVideo, Inc has produced a DVD player that possesses a "time stretching" feature. "Time stretching" allows a user to play a three hour DVD film in two hours, by adjusting the playback speed from half-speed to double-speed while still maintaining the original audio quality of the film.

Another advanced audio product is embodied in a DIR911 audio processor of Eventide Inc., which features an IntelliClear® speed control. The Eventide audio processor DIR911 provides the option to rewind or fast-forward an answer phone message in small segments of 1.25 seconds at a time.

"SpeechSkimmer" is a user interface for skimming speech recordings developed by the Speech Research Group at the MIT Media Laboratory. "SpeechSkimmer" enables a user to hear recorded sounds quickly at several levels of detail by using simple speech processing techniques. "A continuum of time compression and skimming techniques have been designed, allowing a user to efficiently skim a speech recording to find portions of interest, then listen to it time-compressed to allow quick browsing of the recorded information, and then slowing down further to listen to detailed information." (Barry Arons '*SpeechSkimmer: Interactively Skimming Recorded Speech. Proceedings of UIST* 1993: *ACM Symposium on User Interface Software and Technology*. ACM Press. Nov. 3-5, 1993. Atlanta.)

SUMMARY OF THE INVENTION

This invention seeks to provide a system and method for audio buffering and navigation.

There is thus provided in accordance a system for providing enhanced quality audio streaming. The system includes an audio streaming server providing an audio stream, a client including a buffer storing at least portions of the audio stream received from the audio streaming server, a buffer status sensor operative to monitor the contents of the buffer and a client audio output enhancer which operates in response to an output from the buffer status sensor for providing a modified audio stream output.

There is also provided in accordance with a preferred embodiment of the present invention a method for providing enhanced quality audio streaming. The method includes the steps of: providing an audio stream to a client, storing in a buffer at least portions of the audio stream, monitoring contents of the buffer and providing a modified audio stream in response to an output from the monitoring.

Further in accordance with a preferred embodiment of the present invention the client audio output enhancer operates to provide the modified audio stream including inserted audio segments which were not received from the audio streaming server.

Still further in accordance with a preferred embodiment of the present invention the inserted audio segments include silence, pre-recorded audio segments and/or advertisements.

Typically the client includes a telephone. Additionally or alternatively the client includes a telephone and an IVR.

Additionally in accordance with a preferred embodiment of the present invention the client provides a real time output.

There is further provided in accordance with another preferred embodiment of the present invention a system for providing sophisticated seeking in an audio stream. The system includes an audio streaming server providing an audio stream, an audio sampler, intermittently sampling portions of the audio stream, an audio sampling store, storing the portions sampled by the audio sampler and an audio stream portion navigating seeker operative to sequentially render the portions.

There is also provided in accordance with yet another preferred embodiment of the present invention a method for providing sophisticated seeking in an audio stream. The method includes the following steps: providing an audio stream, intermittently sampling portions of the audio stream, storing the intermittently sampled portions of the audio stream and seeking by sequentially rendering the portions.

Further in accordance with a preferred embodiment of the present invention the audio sampler is operative to sample complete phrases.

Still further in accordance with a preferred embodiment of the present invention the audio stream portion navigating seeker operates to insert at least one audible tone among the portions rendered thereby.

Further in accordance with a preferred embodiment of the present invention the audio sampler is voice command responsive.

Additionally in accordance with a preferred embodiment of the present invention the audio sampler samples portions which are selected generally periodically.

Typically the audio stream portion navigating seeker operates to render via a telephone. Additionally or alternatively, the audio stream portion navigating seeker is operative to render via an IVR and a telephone.

Further in accordance with a preferred embodiment of the present invention the system also includes a user operative, seeking responsive audio stream renderer, operating to render the audio stream beginning from a sampled portion selected by a user.

BRIEF DESCRIPTION OF THE DRAWINGS

The present invention will be more fully understood and appreciated from the following detailed description, taken in conjunction with the drawings, in which.

DETAILED DESCRIPTION OF A PREFERRED EMBODIMENT

The present invention provides a system and methodology for enhancing the streaming of audio and for sophisticated seeking within audio by sampling phrases from a given audio segment. The streaming of audio is provided by a streaming audio server, which may be any suitable device that provides a suitable audio output. Such output may be live but need not necessarily be live. Examples of a suitable streaming audio server are an HTTP server, a disc cache and a REALAUDIO® streaming server. A user's experience of audio can be enhanced by enabling the user increased control over navigation within an audio sample. To assist in understanding the present invention, three simplified example sessions are described herein-below:

Example Session 1

A telephone user who wishes to listen to audio may place a telephone call to the system of the present invention. The system of the present invention may send the streaming audio to the telephone. A user listening to the streaming audio may experience periods of buffering due to network congestion.

The system of the present invention may monitor the rate of playback (bytes per second) and may detect the number of bytes that are needed in order to replenish the supply of received bytes in a buffer. Additionally, the system of the present invention may analyze the streaming audio and judge how often there will be a chance to insert bytes within the streaming audio. The system of the present invention may also detect the best place to insert extra bytes and whether to insert background noise, silence or third party background music. The system may then insert the extra bytes.

Example Session 2

A user may wish to watch a one-hour video lecture on 'general relativity' via a telephone or any other suitable audio-visual client. The visual cues from the video may be minimal as the visual appearance of the lecturer and of the background may remain relatively unchanged for the entire duration of the lecture. The user may want to fast forward the lecture to the section on 'gravitation' that takes place approximately 20 minutes after the lecture starts. In this scenario, the present invention may provide a system and methodology for sophisticated seeking, preferably by sampling phrases from the audio, such as one phrase out of every seven phrases.

When seeking within the aforementioned audio segment, the user may be able to rewind or fast forward through numerous phrases of the lecture and hear only a sub-set of phrases. This sub-set of phrases may provide the user with enough audio cues and enough information to ascertain his "location" within the video, without the user having to listen to the entire audio segment.

Example Session 3

A telephone user may want to access information such as news. The user may specify which news report he wishes to hear and may seek within the news report to find a specific segment. The user may employ the keypad and/or voice commands to navigate through the audio sample and preferably hears a sub-set of audio phrases that may enable the user to easily locate the specific segment.

Figure 1:
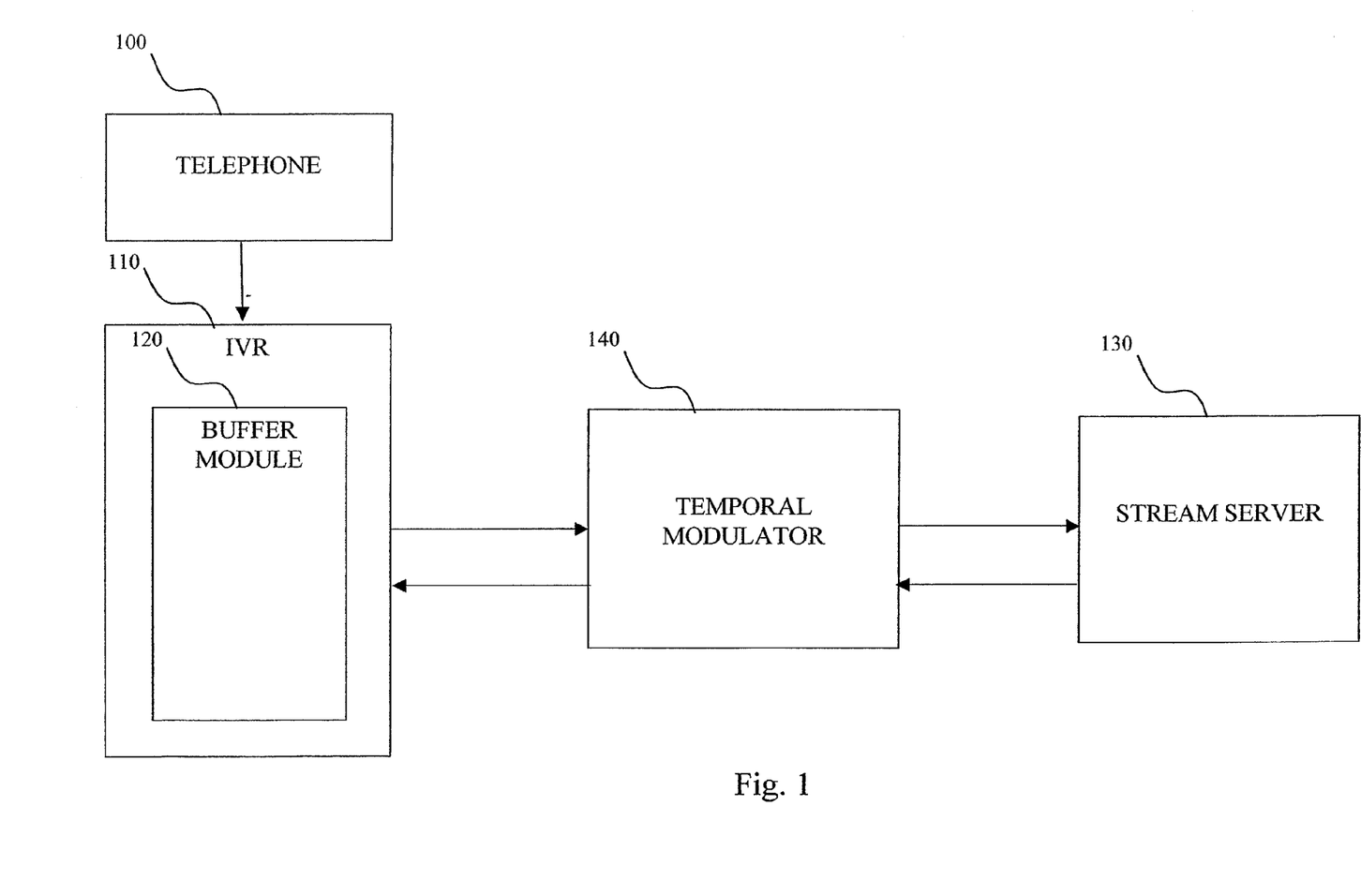
FIG. 1 is a simplified block diagram of a system for audio listening in accordance with a preferred embodiment of the present invention.

Reference is now made to FIG. 1, which is a simplified block diagram of a system for enhanced user experience of audio listening. A user, employing a Telephone or other communicator 100, may place a telephone call to an Interactive Voice Response Unit (IVR) 110, which may contain a Buffer Module 120. The user may wish to access audio content on an audio streaming server 130, such as a Content Streaming Server, as described in U.S. patent application Ser. No. 09/798,377 entitled "Telephone and Wireless Access to Computer Network-Based Audio".

The audio content may be streamed through a Temporal Modulator 140 and buffered with the Buffer Module 120. Should the user elect to seek within the audio stream, the Temporal Modulator 140 may be employed as described herein-below with reference to FIG. 4. Furthermore, should network congestion require the system to re-buffer, the Buffer Module 120 may be utilized as described hereinbelow with reference to FIG. 2.

Figure 2:
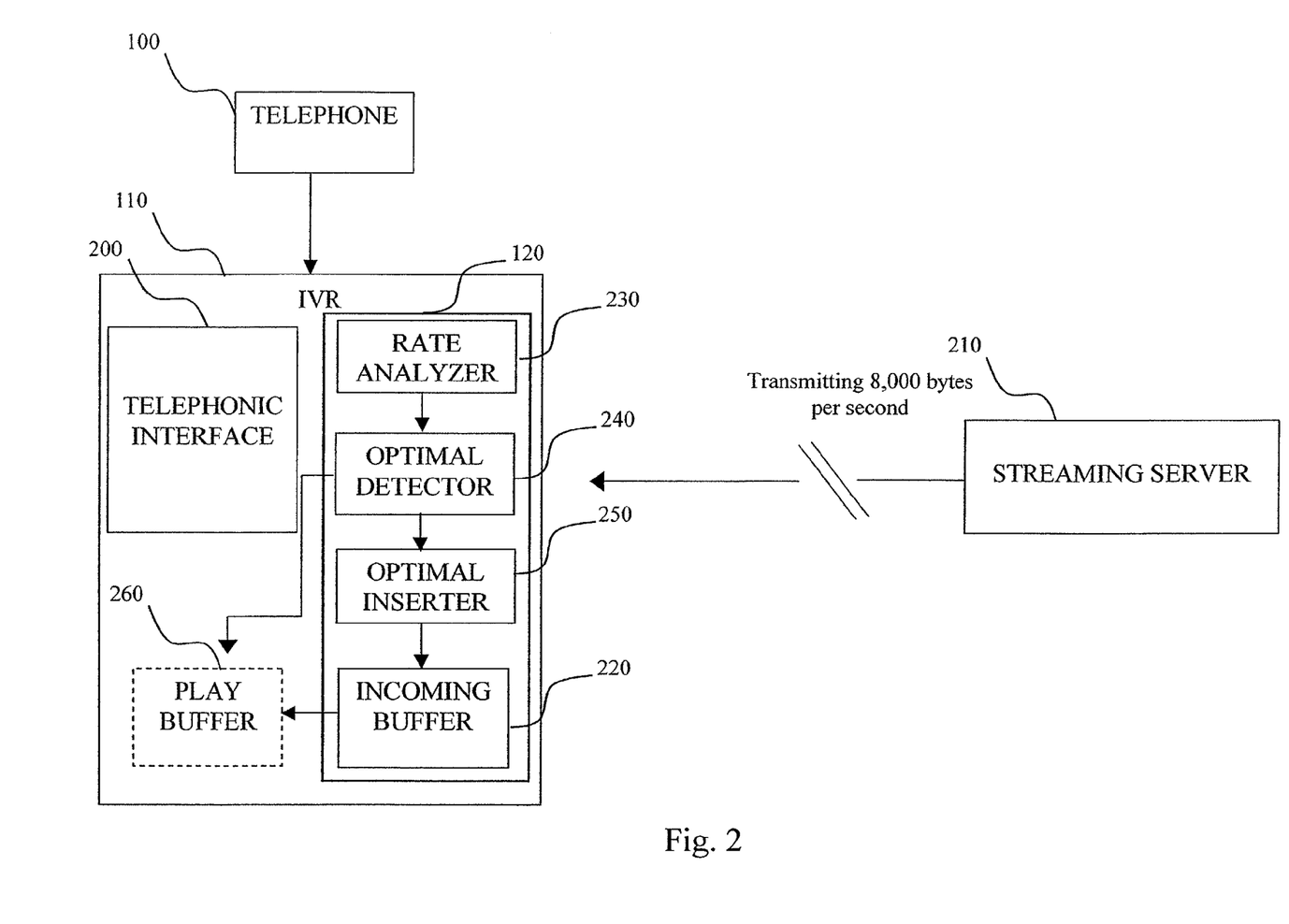
FIG. 2 is a simplified block diagram of a process involved in enhanced buffering of audio in accordance with a preferred embodiment of the present invention.
Figure 3:
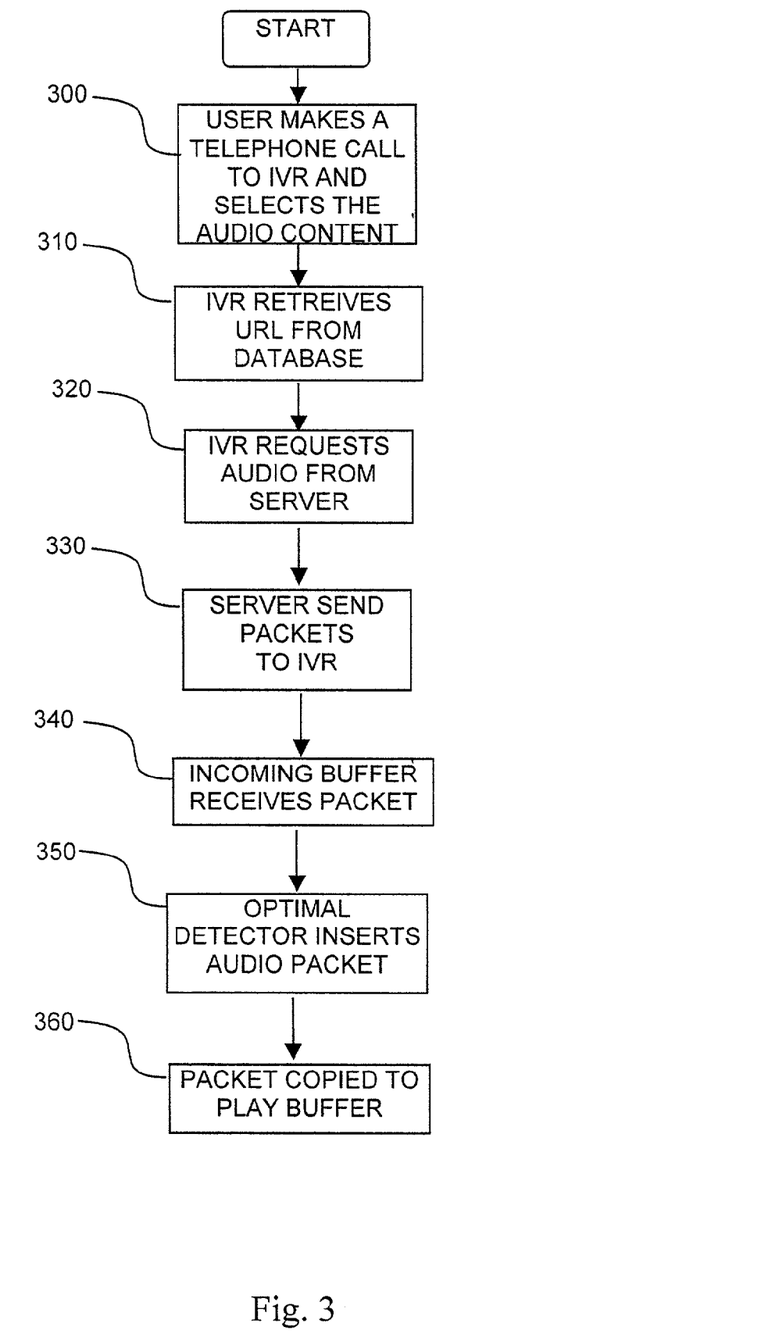
FIG. 3 is a simplified flowchart illustration describing an example of a method of operation of the system shown in FIG. 2.

Reference is now made to FIG. 2, which is a schematic diagram of the functionality involved in buffering audio over the telephone and to FIG. 3, which is a simplified flowchart illustration describing an example of a method of operation of the system shown in FIG. 2. In a preferred embodiment of the present invention, a user may wish to hear audio via the Telephone or other communicator 100. The user may connect via the Telephone or other communicator 100 (FIG. 1) to an IVR 110 (FIG. 1), using a Telephonic Interface 200, forming part of the IVR 110 and employ the IVR 110 for selecting specific audio content.

The user may select the audio content in various ways. For example, the user may have previously defined a set of personal preferences, which are stored on an easily accessible database (not shown) for later access via the telephone. Reference is made in this connection to assignee's copending U.S. patent application Ser. No. 09/798,377 entitled 'Telephone And Wireless Access To Computer Network-Based Audio', the disclosure of which is hereby incorporated by reference.

The user may access the previously defined personal preferences through the IVR 110. The personal preferences may include Uniform Resource Locators (URLs) indicating the location of specific audio content on the Internet.

Another method for the user to select the content is to navigate menus of predefined audio content options, as illustrated in FIG. 3. The user may employ Dual Tone Multi Frequency (DTMF) and/or voice input to select the specific audio content [step 300]. Once the user has made a selection, the IVR 110 may retrieve the requested URL, referencing the specific audio content from a database (not shown) [step 310]. Next, the IVR 110 connects via the Internet to a Streaming Server 210 and receives an audio stream of the selected content.

Alternatively, IVR 110 may be preset to play the content.

The IVR 110 then requests the audio content from the Streaming Server 210 [Step 320]. Preferably, the Streaming Server 210 transmits a buffer of 8,000 bytes per second to the IVR 110 [step 330]. These 8,000 bytes correspond to roughly one second of audio. The telephone user 100 may be listening to this one second of audio while new audio information may be transmitted and relayed to the Buffer Module 120. The Buffer Module 120 may contain an Incoming Buffer 220, a Rate Analyzer 230, an Optimal Detector 240 and an Optimal Inserter 250. The new information may be placed in the Incoming Buffer 220, where it may be copied to the Play Buffer 260 [step 340]. The Incoming Buffer 220 may have a fixed capacity for bytes whereas the capacity of the Play Buffer 260 typically is variable.

Should the new incoming information be delayed or slowed down, Rate Analyzer 230, which monitors the rate of playback (bytes per second), may detect that bytes are needed in order to replenish the supply in the play buffer. Optimal Detector 240, located within the IVR, which preferably analyzes the stream, may determine how often to insert these bytes within the present stream. The Optimal Detector 240 may detect background sound and locate the best place to insert these extra bytes. The Optimal Inserter 250 may determine whether to insert background noise, silence or third party background music in the form of a packet [step 350]. The packet may then be copied to the Play Buffer 260 [step 360].

Figure 4:
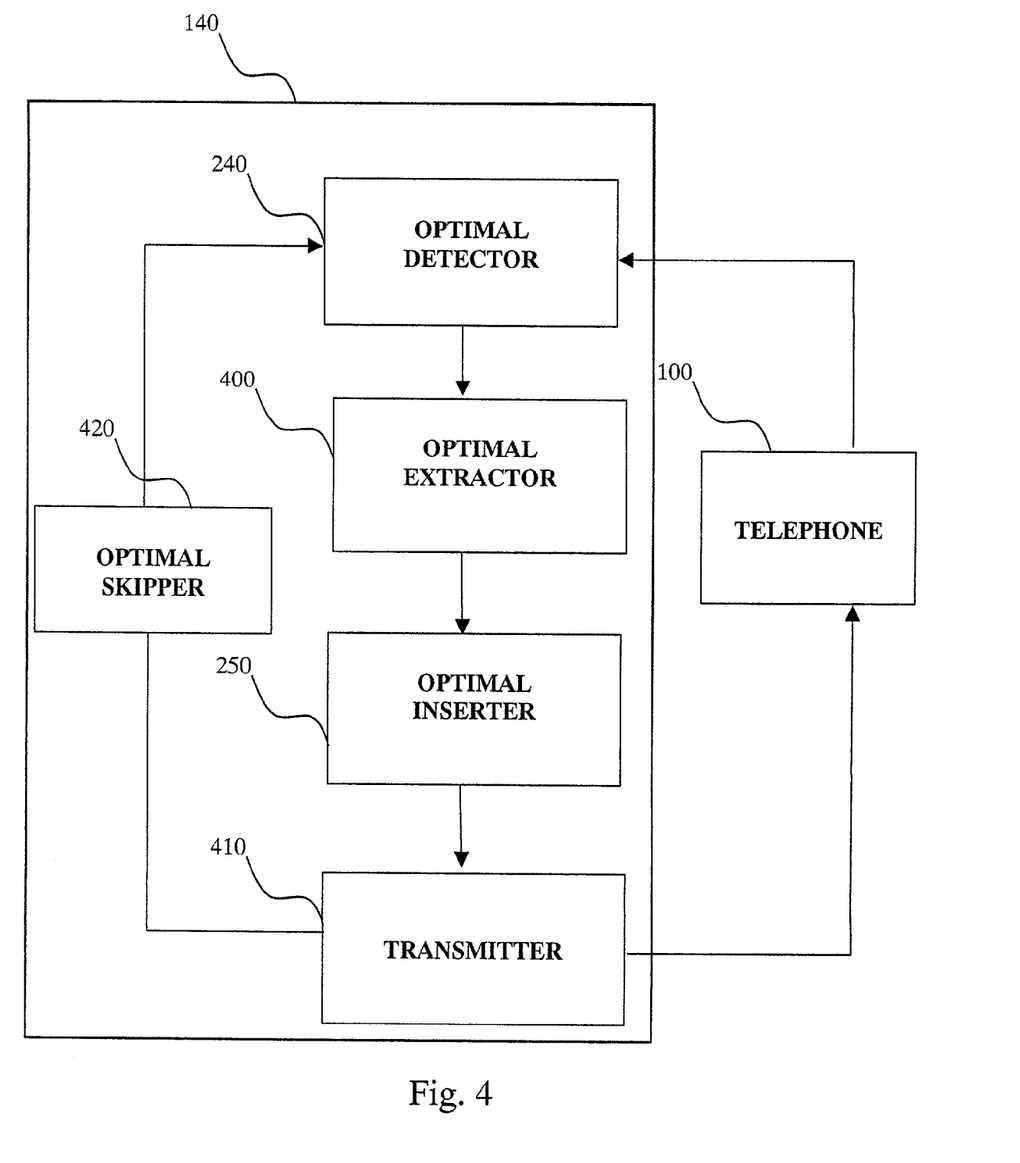
FIG. 4 is a block diagram illustration of a system and methodology for sampling audio phrases constructed and operative in accordance with a preferred embodiment of the present invention.
Figure 5:
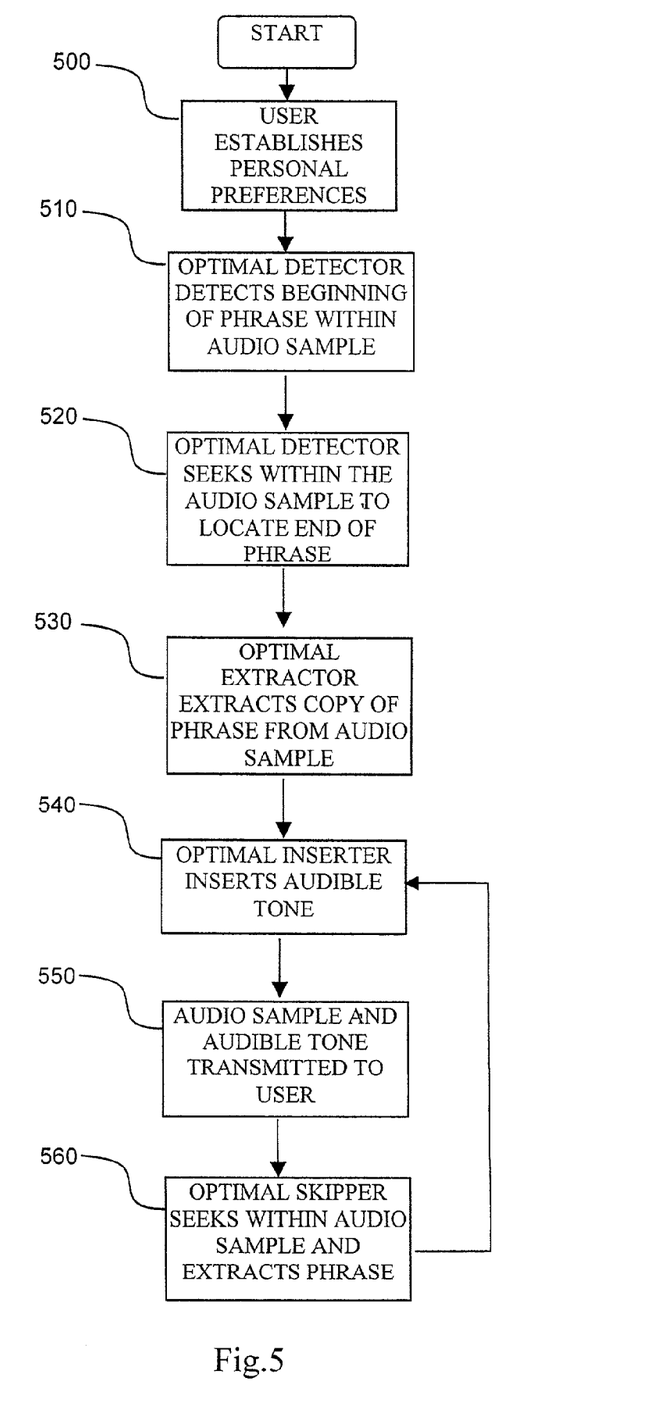
FIG. 5 is a simplified flowchart illustration describing an example of a method of operation of the system shown in FIG. 4.

Reference is now made to FIG. 4, which is a block diagram illustration of preferred functionality of the method and system of the present invention as shown in FIG. 1, and to FIG. 5, which is a simplified flow chart illustrating preferred operation of the system of FIG. 4, in accordance with a preferred embodiment of the present invention. In one embodiment of the present invention, a User, preferably employing a Telephone or other communicator 100, may want to navigate a sample of audio and receive audible cues enabling the user to better orientate himself.

As illustrated in FIG. 5, the user may first establish personal preferences, for instance, to play one phrase in every eight phrases of the audio sample [step 500]. Next, the Optimal Detector 240 may detect the beginning of a current phrase within the audio sample [step 510]. The Optimal Detector 240 may then seek within the audio sample and locate the end of the phrase [step 520]. An Optimal Extractor 400 may extract a copy of the phrase from the audio sample [step 530]. An Optimal Inserter 250 may insert an audible tone after the phrase [step 540]. After the audible tone is inserted, the audio sample and the audible tone may be transmitted to the user via Transmitter 410 [step 550].

The user may hear an audio segment including a sample phrase followed by an audible tone. While the user hears the audio segment, an Optimal Skipper 420 may seek forward or backwards within the audio sample and extract a further phrase [step 560]. The further extracted phrase may be distant from the previous phrase, for example, eight phrases later in the audio sample. As before, an audio segment may be constructed, including the extracted phrase followed by an audible tone. The audio segments are continuously relayed to the user in this manner.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The present invention is not limited by what has been particularly shown and described hereinabove. Rather the scope of the present invention includes both combinations and subcombinations of features described hereinabove as well as modifications thereof which would occur to a person of skill in the art upon reading the foregoing description and which are not in the prior art.

The invention claimed is:

1. A system for audio streaming, the system comprising:
an audio streaming server providing an audio stream;
a client including a buffer storing at least portions of said audio stream received from said audio streaming server;
a buffer status sensor operative to: (1) monitor a rate of playback of said stored portions of said audio stream in said buffer, and (2) monitor a rate of said audio stream received from said audio streaming server to determine if said audio stream received from said audio streaming server is delayed or slowed down, said buffer status sensor identifying, as a function of (a) said playback rate of said stored portions of said audio stream in said buffer and (b) said rate of said audio stream received from said audio streaming server, one or more locations in said stored portions of said audio stream stored in said buffer where an audio segment could be inserted when said audio stream from said audio streaming server is determined to be delayed or slowed down; and a client audio output inserter operative in response to an output from said buffer status sensor to provide a modified audio stream output from said buffer including pre-recorded audio segments, which were not received from said audio streaming server, inserted at one or more of said identified locations.

2. A system according to claim 1 and wherein said inserted audio segments comprise, advertisements.

3. A system according to claim 1 and wherein said client comprises a telephone.

4. A system according to claim 1 and wherein said client comprises a telephone and an IVR.

5. A system according to claim 1 and wherein said client provides a real time output.

6. A method of audio streaming, the method comprising:
providing an audio stream to a client;
storing in a buffer at least portions of said audio stream;
monitoring a rate of playback of said stored portions of said audio stream in said buffer and monitoring a rate of said received audio stream to determine if said received audio stream is delayed or slowed down, wherein said monitoring of said playback rate of said contents of said buffer and said monitoring of said audio stream rate are performed by a buffer status sensor, and said buffer status sensor identifying, as a function of the monitored playback rate of said stored portions of said audio stream in said buffer and said monitored rate of said received audio stream, one or more locations in said audio stream where an audio segment could be inserted when said audio stream is determined to be delayed or slowed down; and providing a modified audio stream, which includes inserting pre-recorded audio segments, which were not received in said audio stream, at one or more of said identified locations.

7. A method according to claim 6 and wherein said inserted audio segments comprise advertisements.

8. A method according to claim 6 and wherein said client comprises a telephone.

9. A method according to claim 6 and wherein said client comprises a telephone and an IVR.

10. A method according to claim 6 and wherein said modified audio stream is a real time output.

11. The system of claim 1 wherein said client audio output inserter provides audible cues from a sample of audio selected by a user.

12. The method of claim 6 wherein said providing a modified audio stream further comprises providing audible cues from a sample of audio selected by a user.

13. The system of claim 1 wherein said pre-recorded audio segments comprise one of background noise and background music.

14. The method of claim 6 wherein said providing a modified audio stream includes pre-recorded audio segments, the pre-recorded audio segments comprising one of background noise and background music.

* * * * *